March 6, 1962   R. D. COOK ET AL   3,023,920
OUTLET BOXES
Filed Jan. 14, 1960

INVENTORS.
Raymond D. Cook
William A. Lang
BY

THEIR ATTORNEYS

United States Patent Office 3,023,920
Patented Mar. 6, 1962

3,023,920
OUTLET BOXES
Raymond D. Cook, Wexford, and William A. Lang, Pittsburgh, Pa., assignors to Steel City Electric Co., Pittsburgh, Pa., a corporation of Pennsylvania
Filed Jan. 14, 1960, Ser. No. 2,457
1 Claim. (Cl. 220—3.6)

This invention relates to outlet boxes and, more particularly, to an improved outlet box for use in thin walls made of plasterboard which have no studding.

In low-cost, mass production housing now being built, the interior walls have no studding. Instead, a piece of plasterboard or like material is positioned between the floor and the ceiling and a layer of plaster is put on each side of the plasterboard to complete the wall. In such a construction, conventional outlet boxes which are adapted to be fastened to studding cannot be used. Instead, a hole is cut in the plasterboard and the box inserted in the hole and held in position by engagement with the plasterboard. Outlet boxes for this purpose should be inexpensive to manufacture and easily installed. Furthermore, the amount of plasterboard removed should be minimized. Our invention provides such an outlet box. It can be readily manufactured and easily installed. The area of the hole in the plasterboard need be no greater than the area of the face of the outlet box.

In the accompanying drawings, we have illustrated the present preferred embodiments of our invention wherein.

Figure 1:
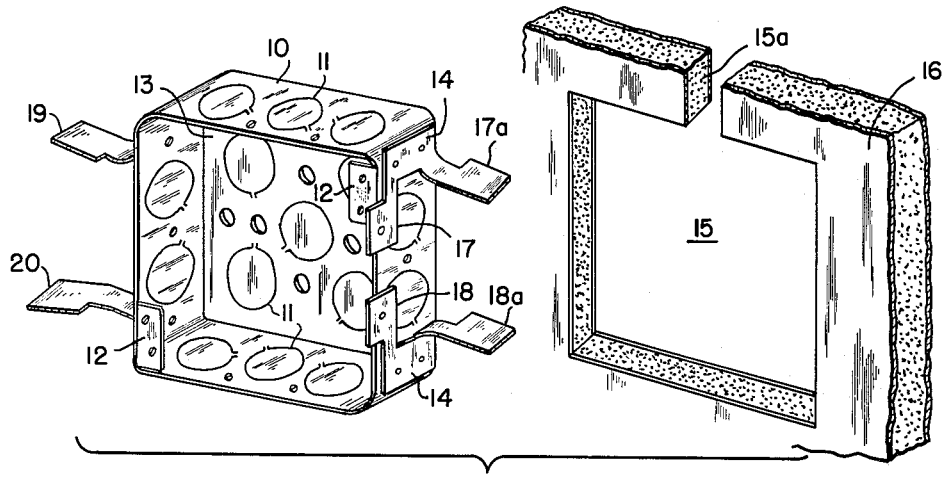
FIGURE 1 is a perspective view of our improved outlet box and the wall prepared for the insertion of the outlet box therein.

Referring to the drawings, an outlet box embodying our invention comprises a rectangular casing 10 made of thin sheet material such as steel. A plurality of conventional knockout plugs 11 are spaced around the casing. The casing may be hollow or be closed by a back plate 13 formed integrally therewith. The casing is provided with means such as tabs 12 having tapped holes to attach a conventional cover plate, not shown. If it is desired to have an outlet on each side of the wall, similar means may be provided on each side of the casing. If, however, an outlet is required on only one side of the wall, a back plate 13 may be formed integrally with the casing as shown in the drawings.

A plurality of tabs, designated generally at 14, are affixed to two opposed sides of the casing. These tabs are stamped from thin sheet metal, the thickness and strength of the metal being such that the tabs may be easily bent by a workman at the point of installation, yet strong enough to retain their position and support the box after being bent. In the preferred embodiment shown in FIGURE 1, the tabs are U-shaped. The closed ends of two tabs are affixed to opposite ends of each of two opposed sides of the casing. The legs of the tabs on the same side of the casing face each other and are bendable at right angles to the casing. The distance between the legs of the U-shaped tab is just slightly greater than the thickness of a piece of plasterboard used in the wall in which the outlet box is to be positioned. While the U-shaped configuration of the tabs is preferred because such tabs are easier to manufacture and simpler to install, it is possible to use two straight tabs on each side of the casing U-shaped tab shown. The straight tabs would be spaced a distance equal to the distance between the legs of the U-shaped tabs.

Figure 2:
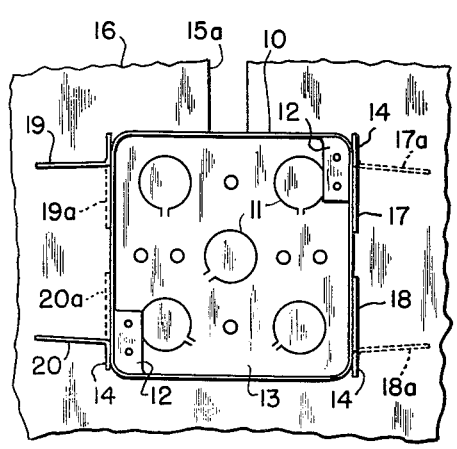
FIGURE 2 is an elevation view showing the outlet box inserted in the wall.
Figure 3:
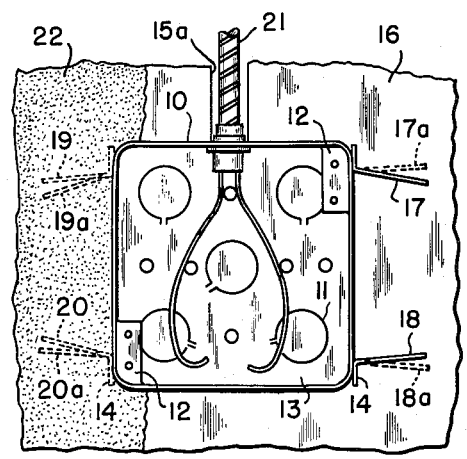
FIGURE 3 is an elevation view showing the outlet box in the wall and affixed thereto with an electric conduit attached thereto.

Outlet boxes embodying our invention are shipped to the point of installation with the tabs flush against the sides of the casing. The wall is prepared for insertion of the outlet box by cutting a hole 15 in the plasterboard having a surface area just slightly larger than the area of the face of the outlet box. A slot 15a leading from hole 15 to a conduit-carrying wall, ceiling or floor is also cut in the plasterboard. The outlet box may then be inserted in hole 15 with all tabs flush with the casing and thereafter the legs of all the tabs bent at right angles to the casing so that one edge of each leg bears against the plasterboard thereby holding the box in position. However, we have found it easier if, prior to insertion of the box in the hole, one leg of each tab is bent at right angles to the casing prior to positioning of the box in the wall, as shown in FIGURE 1. We prefer to bend the rear legs 17a and 18a on one side of the casing and the front legs 19 and 20 on the opposed side of the casing prior to positioning the box in the hole 15. The box is inserted in the hole edgewise and rotated until the bent legs contact the wall, legs 17a and 18a bearing against the rear of the wall and legs 19 and 20 bearing against the front of the wall as shown in FIGURE 2. The remaining legs 17, 18, 19a and 20a are then bent at right angles to the casing as shown in FIGURE 3. Conduit 21 may then be led to the box through slot 15a. Usually a conventional cover plate, either single or duplex, is attached to the casing by means such as screws inserted in the tapped holes of tabs 12. The wall is finished by covering the plasterboard with plaster 22 which, in addition to providing a surface for the wall, holds the legs of the tabs in position. Electrical devices such as switches or receptacles may then be connected to the wiring in conduit and mounted on the cover plate. The necessary face plates may then be attached.

From the foregoing, it is apparent that our outlet box may be readily manufactured and easily installed.

While we have described the presently preferred embodiment of our invention, it is to be understood that it may be otherwise embodied within the scope of the appended claim.

We claim:

An outlet box for mounting in thin walls, said box comprising: a rectangular casing having side walls, edges of the side walls defining at least one rectangular opening, knock-out plugs in said casing, at least one pair of flat planar tabs rigidly fastened to each of two opposed side walls of the casing, each of said tabs having an end portion only fastened to said walls, the tabs of each pair being contiguous with and parallel to the outer surface of the side wall of the casing to which it is attached and with their opposed inner sides parallel to the plane of said rectangular opening, the tabs of each pair being spaced apart a distance equal to the thickness of the wall in which the casing is to be mounted and being bendable outwardly from the adjacent casing walls in planes parallel to the plane of said rectangular opening to grip opposed sides of said thin wall and said casing including means to fasten a cover plate across said opening.

References Cited in the file of this patent
UNITED STATES PATENTS

| | | |
|---|---|---|
| 2,371,210 | Atkinson | Mar. 13, 1945 |
| 2,831,597 | Lo Grasso | Apr. 22, 1958 |